United States Patent [19]

Westley

[11] Patent Number: 4,572,333

[45] Date of Patent: Feb. 25, 1986

[54] SPEED GOVERNING AND DECOUPLING DRIVE MECHANISM

[75] Inventor: Curtis E. Westley, St. Louis Park, Minn.

[73] Assignee: Honeywell Inc., Minneapolis, Minn.

[21] Appl. No.: 600,743

[22] Filed: Apr. 16, 1984

[51] Int. Cl.⁴ .................... F03G 1/08; F16D 67/02; F16D 59/00

[52] U.S. Cl. .................... 185/40 R; 188/184; 192/17 R; 251/69; 251/129.11

[58] Field of Search ............ 185/40 R; 192/17 R; 188/184; 251/69, 133

[56] References Cited

U.S. PATENT DOCUMENTS

| | | | |
|---|---|---|---|
| 2,148,185 | 2/1939 | Blocker | 192/17 R |
| 2,949,980 | 8/1960 | Ericsson et al. | 188/184 |
| 3,144,102 | 8/1964 | Nomann | 185/40 R X |
| 4,203,573 | 5/1980 | Boss | 185/40 R X |
| 4,273,307 | 6/1981 | Malinski et al. | 251/69 |
| 4,333,489 | 6/1982 | Magill et al. | 185/40 R X |
| 4,456,805 | 6/1984 | Jorgensen et al. | 188/184 X |

OTHER PUBLICATIONS

Van Nostrand's Scientific Encyclopedia, pp. 1199, 1200 (5th ed. 1976).

Primary Examiner—Allan D. Herrmann
Attorney, Agent, or Firm—Charles L. Rubow

[57] ABSTRACT

A decoupling and speed governing mechanism is disclosed for a spring returned drive train driven by a stepper motor. A pinion assembly in the drive train is rotatably coupled to the rotor by dogs on the assembly which engage spokes in a rotor in the motor when the assembly is in a first position along the axis of the rotor. The pinion assembly also includes weighted shoes which move outwardly when the assembly rotates at greater than a predetermined speed to frictionally engage an internal drum surface in the rotor to govern the drive train speed when the assembly is in a second axial position relative to the rotor.

20 Claims, 7 Drawing Figures

SPEED GOVERNING AND DECOUPLING DRIVE MECHANISM

BACKGROUND OF THE INVENTION

The invention disclosed herein relates generally to mechanical rotary drive mechanisms, and more particularly to drive trains of the type which are driven in at least one direction by an electric motor and driven in the opposite direction by a spring return device.

In ventilating and air conditioning systems it is common to utilize dampers and/or valves for controlling the temperature, humidity and distribution of a fluid medium used in controlling conditions in an air conditioned space. Where air is used as the fluid medium, dampers may be used for mixing varying proportions of air at different temperatures and/or humidities within the air conditioning system, mixing air within the system with variable amounts of outside air for achieving operating economies, and distributing conditioned air to areas within the conditioned space.

The dampers or valves in air conditioning systems and other devices in a variety of applications may be positioned by means of an electric motor which is operable in one or both directions. In systems of the type which employ a single direction motor the motor and an associated drive train are used to move the damper or other device in one direction, and a return spring is typically used to produce movement in the opposite direction. In systems of the type which employ a reversible motor a return spring may be employed to provide return operation in the event of electrical power failure. The characteristics of the motor and the gearing ratio of the drive train may be such that the spring is unable to return the damper or other device as long as the motor is mechanically engaged with the drive train. Thus, when it is desired to move the damper or other device by means of the return spring, the drive train must be disengaged from the motor.

With the motor decoupled from the drive train, and absent some provision for controlling the speed of the drive train, the drive train may reach an excessive return speed before being halted abruptly by a limiting position stop. Particularly if the drive train and/or devices connected thereto have substantial inertia, components may be broken, distorted or weakened by the abrupt stop. Therefore, it is common to provide some means for governing the return speed. Many actuators of the type described employ oil filled gear boxes. In such designs, the viscosity of the oil fill may provide adequate speed control. Further, the speed governing action of the oil fill may be enhanced by paddle wheel arrangements in the drive train.

It is also known to provide mechanical speed governors in which an assembly rotated by the drive train includes movably mounted weights which are displaced outwardly by centrifugal force when the rotational speed of the assembly exceeds a predetermined value. Movement of the weights may be used to bring a portion of the rotating assembly into contact with a stationary surface to achieve a speed retarding effect. In simplest form, the weights themselves may be configured with surfaces which frictionally engage a stationary surface.

The primary driving, decoupling and speed governing functions of a drive mechanism can be performed by separate elements. However, for purposes of minimizing complexity of the mechanism and reducing its weight, size and cost, it is desirable to provide an implementation in which multiple functions are performed by a reduced number of components. Accordingly, the applicant has produced a unique drive mechanism design in which primary drive, decoupling and speed governing functions are achieved with a minimum number of simple multiple function components.

SUMMARY OF THE INVENTION

The present invention is a drive mechanism for decoupling and governing the return speed of a spring returned drive train which is driven by a motor in which the rotor exhibits significant resistance to rotation when the motor is unenergized. A pinion assembly in the drive train is rotatable about and slidable along the axis of rotation of the rotor and includes first engagement elements which mate with complementary engagement elements on the rotor when the pinion assembly is in a first axial position relative to the rotor. The pinion assembly also includes weighted shoe means which are radially displaced by rotation of the pinion assembly at greater than a predetermined speed, the shoe means being located within a drum surface on the rotor and adapted to frictionally engage the drum surface to govern the speed of the pinion assembly when it is in a second axial position. The pinion assembly is axially positioned by an actuator which may comprise a solenoid controlled lever arrangement.

DESCRIPTION OF THE PREFERRED EMBODIMENT

Figure 1:
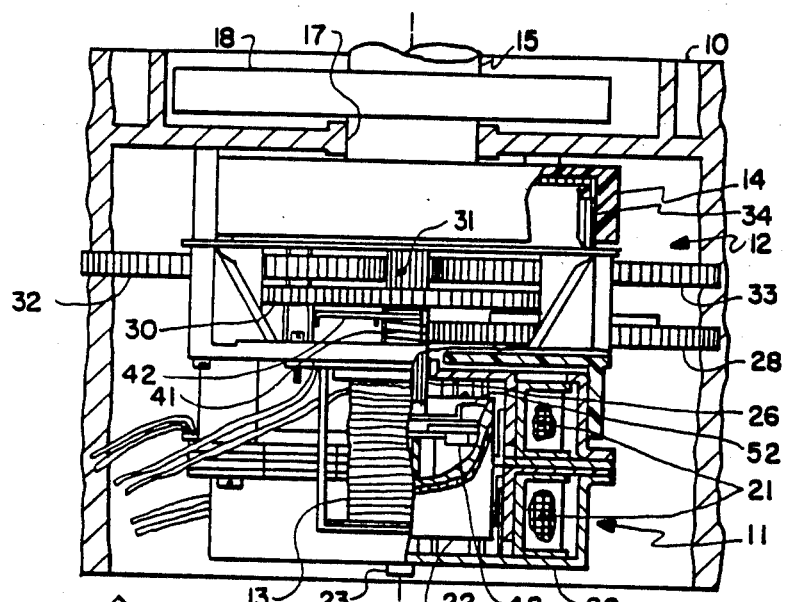
FIG. 1 is a partially broken away side view of an actuator including a drive mechanism in accordance with the applicant's invention.
Figure 2:
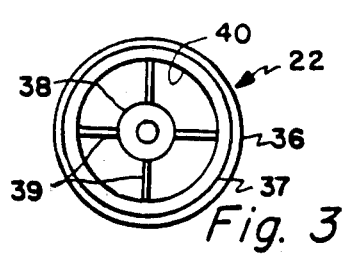
FIG. 2 is a top view of the actuator of FIG. 1 showing a return spring employed therein.

In FIG. 1, reference numeral 10 identifies a housing in which is mounted a stepper motor generally identified by reference numeral 11 and a gear train generally identified by reference numeral 12 releasably coupled to motor 11 by means of a coupling arrangement actuated by a solenoid 13. The final stage of gear train 12 is as ring gear 14 with internal gear teeth mounted on an output shaft 15 carried in a bearing 17 in housing 10. A spiral spring 18 forming a spring motor (see FIG. 2) is wound around output shaft 15. One end of spring 18 is fixed to shaft 15 and the other end is restrained by a portion of housing 10 so as to urge shaft 15 to rotate in a clockwise direction as viewed in FIG. 2.

Motor 11 comprises a housing and pole assembly 20 which contains a pair of windings 21 surrounding a rotor 22. Rotor 22 is adapted to rotate on a stationary shaft 23 extending along an axis 24. Certain features of motor 11 are the subject of a copending patent application Ser. No. 590,232 filed Mar. 16, 1984 in the name of the same inventor and assigned to the same assignee as the present application. Reference may be made to this copending application for a detailed description of the motor. Motor 11 is of a type which operates in at least the direction required to rotate shaft 15 in a counterclockwise direction. As is characteristic of stepper motors, rotor 22 exhibits a substantial cogging effect or resistance to rotation when motor 11 is unenergized. More specifically, rotor 22 tends to assume one of a plurality of preferred positions relative to the poles.

A pinion assembly 26 which will be described in greater detail hereinafter is mounted on shaft 23 for rotation about and displacement along the shaft. Pinion assembly 26 drives a gear 28 coupled to a pinion (not shown) through an integral adjustable slip clutch which is the subject of a copending patent application Ser. No. 586,151 filed Mar. 5, 1984 in the name of the same inventor and assigned to the same assignee as the present application. Reference may be made to this copending application for a detailed description of the slip clutch arrangement, along with gear 28 and its associated pinion.

The pinion associated with gear 28 drives a gear 30 having a pinion 31 thereon which drives a pair of gears 32 and 33, each having a pinion which meshes with the internal gear teeth on ring gear 14. A portion of the pinion on gear 33 is visible in FIG. 1 where it is identified by reference numeral 34.

As is apparent, gear train 12 provides substantial speed reduction and torque amplification. Because of the characteristics of gear train 12 and the cogging effect of rotor 22 when motor 11 is unenergized, gear train 12 must be decoupled from rotor 22 in order to permit spring 18 to return shaft 15 in a clockwise direction after it has been rotated in a counterclockwise direction by motor 11.

Figures 3, 5:
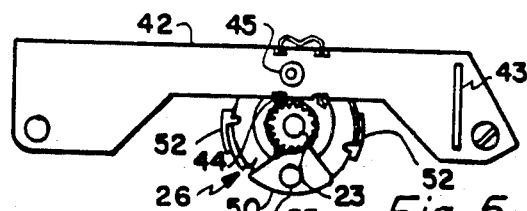
FIG. 3 is an end view of the rotor in an electric motor in the actuator of FIG. 1.
FIG. 5 is another view of the elements depicted in FIG. 4.

As shown in FIG. 3, rotor 22 comprises a permanently magnetized shell 36 on a drum 37 connected to a hub 38 through a plurality of spokes or ribs 39. Hub 38 and spokes 39 are shorter in length along axis 24 than drum 37 which, along a portion of its length, has an unobstructed circular internal drum surface 40.

Figure 4:
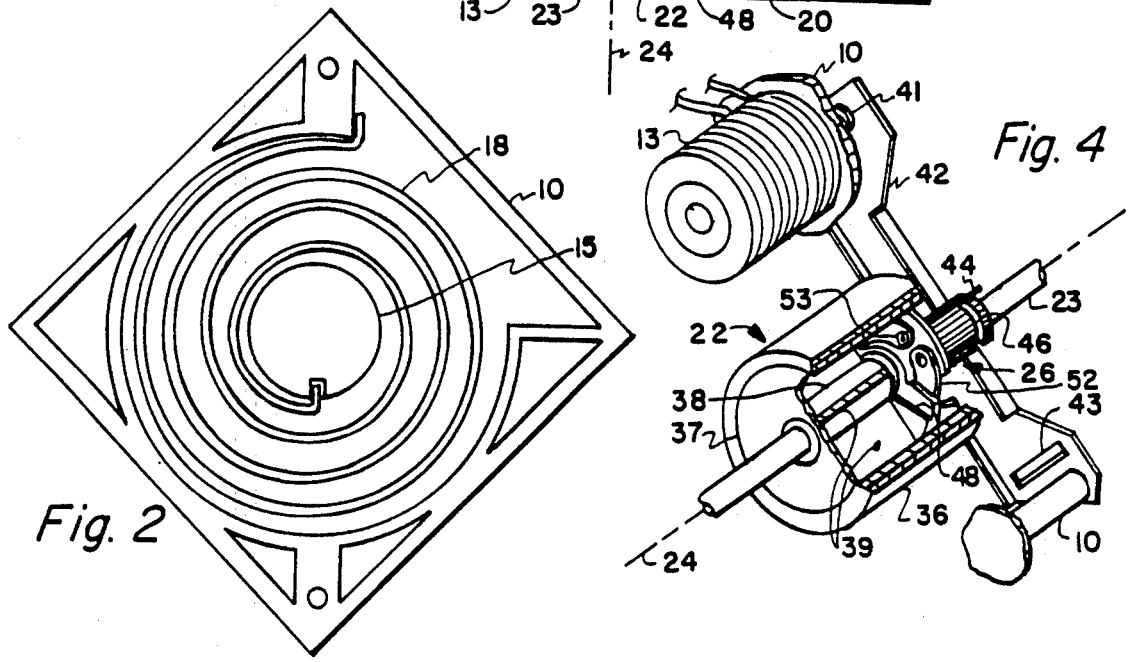
FIG. 4 is a partially broken away pictorial representation of the principal elements of the decoupling and speed governing mechanism employed in the actuator of FIG. 1.

As shown in FIG. 4, pinion assembly 26 is mounted on shaft 23 along with rotor 22. A lever 42 is positioned adjacent pinion assembly 26 and extends traversely to axis 24. One end of lever 42 is attached to a portion of housing 10 through a hinge at 43 formed by a slotted portion of the lever. The other end of lever 42 is movable in a direction parallel with axis 24, and its position is determined by solenoid 13 and a coil spring 41 between the lever and a portion of housing 10.

A wire finger 44 is fastened to lever 42 at approximately the midpoint of the lever by means of a rivet 45. Finger 44 extends perpendicularly to axis 24 and lever 42, and rides in a circumferential groove 46 near one end of pinion assembly 26. Thus, pinion assembly 26 may be moved between first and second axial positions along axis 24 by actuating or deactuating solenoid 13.

Figure 6:
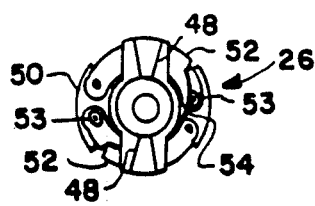
FIG. 6 is an end view of a pinion assembly partially shown in FIGS. 1, 4 and 5.
Figure 7:
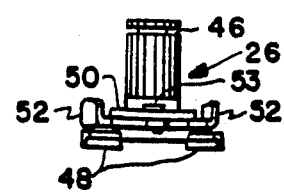
FIG. 7 is a side view of the pinion assembly of FIG. 6.

As can be seen more clearly in FIGS. 6 and 7, the end of pinion assembly 26 opposite groove 46 is configured with a pair of dogs 48. When pinion assembly 26 is in its axial position toward rotor 22, dogs 48 extend between spokes 39 in the rotor. Pinion assembly 26 is thereby rotatably coupled to rotor 22. However, when pinion assembly 26 is in its axial position away from rotor 22, dogs 48 are withdrawn from between spokes 39, and the pinion assembly is decoupled from the rotor.

Pinion assembly 26 is also configured with a flange 50 near the end of the pinion assembly opposite groove 46. A pair of elongated weights 52 are pivotally mounted at one end to flange 50 by means of rivets 53. Weights 52 are formed with arcuate shoe portions conformed to the arc of internal drum surface 40. Weights 52 are biased inwardly by means of a spring clip 54. When weights 52 are in their inward position, the shoe portions do not contact drum surface 40.

However, rotation of pinion assembly 26 subjects weights 52 to centrifugal force. If the rotational speed of pinion assembly 26 becomes excessive, the centrifugal force is sufficient to overcome the bias provided by spring clip 54, and weights 52 move outwardly into contact with drum surface 40. Because rotor 22 resists rotation when motor 11 is unenergized, the rotor effectively becomes a stationary reaction member, and the frictional engagement of weights 52 therewith retards rotation of pinion assembly 26 and governs the rotational speed thereof at a level at which no damage is done when gear train 12 and/or apparatus connected to output shaft 15 reach a limiting position stop.

The overall operation of the applicant's speed governing and decoupling drive mechanism can best be understood in connection with the description of a typical application. Such an application may be in a heating, ventilating and air conditioning system in which the position of a damper is controlled by the actuator shown in FIG. 1. The damper would be mechanically coupled to shaft 15 which can be driven in either direction by the actuator. In normal operation, shaft 15 is driven by stepper motor 11 through gear train 12. The damper would normally be positioned anywhere between minimum and maximum operating positions depending on one or more sensed parameters. However, under some situations, such as power failure, it may be desirable or necessary to reposition the damper to a predetermined position, such as a position which will provide minimum acceptable admittance of outside air for ventilating purposes.

Under normal operating conditions, gear train 12 is mechanically coupled to rotor 22 through pinion assembly 26. Under such conditions, i.e., when power is available, solenoid 13 is actuated and lever 42 is displaced, thereby positioning pinion assembly 26 along shaft 23 to a position in which dogs 48 on the pinion assembly engage spokes 39 in rotor 22.

In the event of power failure or some other event in which it is desired to position the damper in some predetermined position, solenoid 13 is deactuated, thereby repositioning lever 42 to a position in which dogs 48 are disengaged from spokes 39. When pinion assembly 26 is thus decoupled from rotor 22, spring 18 is capable of repositioning shaft 15. The speed at which shaft 15 and any apparatus coupled thereto is repositioned is limited by a speed governing mechanism comprising weights 52 with arcuate shoe portions within internal drum surface 40 of rotor 22. As spring 18 accelerates pinion assembly 26 to a predetermined speed, weights 52 move radially outward against the bias of spring clip 54 and frictionally engaged internal drum surface 40 which forms a stationary reaction surface when motor 11 is not energized. Thus, the speed of the drive train and apparatus connected to shaft 15 is limited to a value which will prevent damage to the gear train and coupled apparatus when these elements come to an abrupt stop at their limiting positions.

In accordance with the foregoing description, rotor 22 and pinion assembly 26 with dogs 48 and weights 52 are of a simple, easily producible and inexpensive design. Yet in combination, they perform the functions of driving the gear train, coupling and decoupling the rotor with the gear train, providing speed retarding reaction forces, and governing the return speed of the gear train. The design is such that many of the components may be formed of molded plastic. Thus, the applicant has provided a unique, simple, compact and inexpensive drive mechanism having a number of desirable operational features.

Although a specific embodiment has been shown and described in detail for illustrative purposes, a number of variations and modifications which do not depart from the applicant's contemplation and teaching will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. A drive mechanism comprising:
   a member rotatable about an axis and slidable along the axis between first and second axial positions;
   first motor means rotationally coupled to said member tending to drive said member at an uncontrolled speed;
   second motor means having a rotor which exhibits significant reluctance to rotation when said second motor means is unenergized;
   coupling means operable to rotationally couple said member to the rotor when said member is in the first axial position, whereby said member may be driven by said second motor means;
   a drum on the rotor in said second motor means;
   weight means mounted on said member and adapted for radial displacement by centrifugal force resulting from rotation of said member faster than a predetermined speed, said weight means being located within said drum when said member is in the second axial position, said weight means having shoe means thereon which frictionally engage said drum so as to govern the speed of said member by reaction forces from the rotor when said member is being driven by said first motor means; and
   positioning means for positioning said member in the first or second axial positions.

2. The drive mechanism of claim 1 wherein:
   said first motor means comprises a spring motor; and
   said second motor means comprises an electric motor with a permanent magnet rotor.

3. The drive mechanism of claim 2 wherein said second motor means is a stepper motor.

4. The drive mechanism of claim 3 wherein said coupling means includes spokes extending between a hub and a rim of the rotor and dogs on said member configured to engage the spokes when said member is in the first axial position.

5. The drive mechanism of claim 4 wherein said weight means includes at least one elongated element pivotally mounted at one end to a flange on said member and biased inwardly by a spring clip.

6. The drive mechanism of claim 5 wherein said weight means includes two substantially identical elongated elements symmetrically arranged about the axis and pivotally mounted on the flange on said member at diametrically opposed locations.

7. The drive mechanism of claim 6 wherein said positioning means comprises:
   a lever hingedly mounted at a first end, said lever extending transversely to the axis adjacent said member and having a finger extending substantially perpendicularly to the lever and the axis and engaging a circular groove in said member perpendicular to and centered on the axis; and
   an actuator connected to a second end of said lever opposite the first end thereof and adapted to displace the second end of said lever in a direction substantially parallel with the axis.

8. The drive mechanism of claim 7 wherein said actuator comprises a solenoid.

9. A drive mechanism comprising:
   a permanent magnet motor having a rotor operable to rotate about an axis in a first direction relative to a plurality of poles, the rotor exhibiting a significant cogging characteristic so that when said motor is unenergized the rotor tends to assume one of a plurality of preferred positions relative to the poles, the rotor having a drum portion with a circular internal surface along the portion of its length and first engaging means;
   a pinion rotatable about and slidable along the axis relative to said rotor between first and second axial positions, said pinion including second engaging means adapted to cooperate with the first engaging means to couple said pinion to the rotor within a fixed range of rotational positions relative thereto when said pinion is in the first axial position, said pinion further including shoe means located within the drum portion of the rotor when said pinion is in the second axial position, the shoe means being radially movable in response to rotation of said pinion in excess of a predetermined speed, whereby the shoe means frictionally engages the internal surface in the drum portion to control the speed of said pinion by reaction forces from the rotor;
   spring drive means coupled to said pinion tending to rotate said pinion in a direction opposite that in which said pinion is rotated by said motor; and
   positioning means for axially positioning said pinion in the first or second axial positions, whereby in the first axial position said pinion is coupled to the rotor to be driven thereby in a first direction, and in the second axial position said pinion is driven in the opposite direction by said spring drive means at a speed not substantially greater than the predetermined speed.

10. The drive mechanism of claim 9 wherein the shoe means comprises two substantially identical elongated elements symmetrically arranged about the axis and pivotally mounted on a flange on said pinion at diametrically opposed locations.

11. The drive mechanism of claim 10 wherein the elongated elements are biased inwardly by a spring clip.

12. The drive mechanism of claim 11 wherein:
    the first engaging means comprises spokes extending between a hub and a rim of the rotor; and
    the second engaging means comprises at least one dog on said pinion configured to engage the spokes when said pinion is in the first axial position.

13. The drive mechanism of claim 12 wherein said motor is a stepper motor.

14. The drive mechanism of claim 13 wherein said positioning means comprises:
   a lever having a first end secured at a fixed location and extending transversely to the axis adjacent said pinion, said lever having a finger extending substantially perpendicularly to the lever and the axis and engaging a circumferential groove in said pinion; and
   a solenoid actuator connected to a second end of said lever opposite the first end thereof and adapted to displace the second end of said lever in a direction substantially parallel with the axis.

15. A mechanism for decoupling and governing the return speed of a spring returned drive train which is driven by a motor in which the rotor exhibits significant resistance to rotation when the motor is unengerized, comprising:
   a pinion assembly in the drive train rotatable about and slideable along the axis of rotation of said rotor;
   coupling means including first and second complementary engagement elements on said rotor and said pinion assembly respectively, said first and second engagement elements mating with one another when said pinion assembly is in a first axial position relative to said rotor, thereby rotatably coupling said pinion assembly and said rotor;
   an internal drum surface in said rotor;
   weighted shoe means on said pinion assembly, said weighted shoe means being radially displacable by centrifugal force resulting from rotation of said pinion assembly at greater than a predetermined speed, said weighted shoe means being located within said drum surface when said pinion assembly is in a second axial position relative to said rotor, said weighted shoe means being adapted to frictionally engage said drum surface to govern the speed of said pinion assembly by reaction forces from said rotor when said pinion assembly is being driven by said spring; and
   positioning means for selectively positioning said pinion assembly in the first or second axial positions relative to said rotor.

16. The mechanism of claim 15 wherein the first and second complementary engagement elements comprise spokes extending between a hub and a rim of said rotor and dogs on said pinion assembly respectively, the dogs being configured to engage the spokes when said pinion assembly is in the first axial position.

17. The mechanism of claim 16 wherein said weighted shoe means includes at least one elongated element pivotally mounted at one end to a flange on said pinion assembly and biased inwardly by a spring clip.

18. The mechanism of claim 17 wherein said weighted shoe means includes two substantially identical elongated elements symmetrically arranged about the axis and pivotally joined to the flange on said pinion assembly at diametrically opposed locations.

19. The mechanism of claim 18 wherein said positioning means comprises:
   a lever having one end at a first location and extending transversely to the axis adjacent said pinion assembly, said lever supporting a finger extending substantially perpendicularly to the lever and the axis and engaging a circular groove in said pinion assembly; and
   an actuator connected to a second end of said lever opposite the first end thereof and adapted to displace the second end of said lever in a direction substantially parallel with the axis.

20. The drive mechanism of claim 19 wherein said actuator comprises a solenoid.

* * * * *